United States Patent
Cabioch et al.

(10) Patent No.: US 11,225,567 B2
(45) Date of Patent: Jan. 18, 2022

(54) AIRCRAFT TIRE

(71) Applicant: COMPAGNIE GENERALE DES ETABLISSEMENTS MICHELIN, Clermont-Ferrand (FR)

(72) Inventors: Jean-Luc Cabioch, Clermont-Ferrand (FR); Jean-Luc Mangeret, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/626,980

(22) PCT Filed: Jun. 27, 2018

(86) PCT No.: PCT/FR2018/051574
§ 371 (c)(1),
(2) Date: Dec. 27, 2019

(87) PCT Pub. No.: WO2019/002766
PCT Pub. Date: Jan. 3, 2019

(65) Prior Publication Data
US 2020/0131347 A1    Apr. 30, 2020

(30) Foreign Application Priority Data

Jun. 30, 2017 (FR) ........................ 1756123

(51) Int. Cl.
| | | |
|---|---|---|
| B60C 1/00 | (2006.01) | |
| B60C 11/00 | (2006.01) | |
| C08L 57/02 | (2006.01) | |
| C08K 5/00 | (2006.01) | |
| C08L 9/06 | (2006.01) | |
| C08L 7/00 | (2006.01) | |

(52) U.S. Cl.
CPC .............. *C08L 9/06* (2013.01); *B60C 1/0016* (2013.01); *B60C 11/0008* (2013.01); *C08L 7/00* (2013.01); *B60C 2200/02* (2013.01); *C08L 2205/03* (2013.01); *C08L 2312/00* (2013.01)

(58) Field of Classification Search
CPC ......... C08L 7/00; C08L 57/02; C08K 5/0016; B60C 1/0016; B60C 11/0008
See application file for complete search history.

(56) References Cited

U.S. PATENT DOCUMENTS

| | | | |
|---|---|---|---|
| 3,393,182 A | 7/1968 | Trepka | |
| 7,250,463 B2 | 7/2007 | Durel et al. | |
| 7,820,771 B2 | 10/2010 | Lapra et al. | |
| 9,670,291 B2 | 6/2017 | Marechal et al. | |
| 10,882,981 B2 | 1/2021 | Blok et al. | |
| 2005/0004297 A1 | 1/2005 | Durel et al. | |
| 2008/0132644 A1 | 6/2008 | Lapra et al. | |
| 2009/0270558 A1 | 10/2009 | Gandon-Pain et al. | |
| 2012/0252928 A1 | 10/2012 | Marechal et al. | |
| 2015/0065655 A1* | 3/2015 | Blok | B60C 1/0016 525/211 |
| 2017/0121509 A1* | 5/2017 | Belin | C08L 9/06 |
| 2017/0198122 A1 | 7/2017 | Rodgers et al. | |
| 2017/0292013 A1 | 10/2017 | Blok et al. | |
| 2018/0215905 A1* | 8/2018 | Mangeret | C08L 7/00 |
| 2018/0290489 A1 | 10/2018 | Mangeret et al. | |
| 2020/0385550 A1 | 12/2020 | Cabioch et al. | |
| 2020/0392314 A1 | 12/2020 | De Gaudemaris et al. | |

FOREIGN PATENT DOCUMENTS

| | | |
|---|---|---|
| WO | 97/36724 A2 | 10/1997 |
| WO | 99/16600 A1 | 4/1999 |
| WO | 03/016387 A1 | 2/2003 |
| WO | 2006/069792 A1 | 7/2006 |
| WO | 2006/069793 A1 | 7/2006 |
| WO | 2011/042507 A1 | 4/2011 |
| WO | 2016/043851 A1 | 3/2016 |
| WO | 2016/053541 A1 | 4/2016 |
| WO | 2017/017123 A1 | 2/2017 |
| WO | 2017/060633 A1 | 4/2017 |
| WO | 2017/109400 A1 | 6/2017 |

OTHER PUBLICATIONS

International Search Report dated Oct. 17, 2018, in corresponding PCT/FR2018/051574 (4 pages).
R. Mildenberg, et al., Hydrocarbon Resins, VCH, New York, chapter 5.5, pp. 141-146 (1997).

* cited by examiner

*Primary Examiner* — Vu A Nguyen
(74) *Attorney, Agent, or Firm* — Venable LLP

(57) ABSTRACT

An aircraft tire has a tread comprising a composition based on at least one elastomeric matrix comprising from 20 to 100 phr of isoprene elastomer and from 0 to 80 phr of a copolymer of butadiene and styrene; a reinforcing filler predominantly comprising carbon black; from 1 to 30 phr of at least one hydrocarbon resin predominantly composed of units derived from aromatic and cycloaliphatic monomers; and a crosslinking system.

11 Claims, No Drawings

AIRCRAFT TIRE

BACKGROUND

The present invention relates to tyres intended to equip aircraft and having improved chevron cutting resistance, notably during the landing phase.

In a known manner, an aircraft tyre must withstand the very particular wear conditions of aircraft tyres. This is because these tyres are subjected to very large variations in temperature and in speed, in particular on landing, where they have to change from a zero speed to a very high speed, causing considerable heating and wear. These particular wear conditions do not concern other types of tyres, such as the tyres of passenger, heavy-duty, civil engineering or offroad vehicles.

In particular, an aircraft tyre is subjected to high stresses during the landing (touch down) phases. On certain coverings, landings may lead to chevron cutting or V-cutting. This chevron cutting may take place from the very first landings depending on the aggressiveness of the runway covering.

It is known practice to use, in aircraft tyre treads, rubber compositions based on natural rubber and on carbon black, these two main elements making it possible to obtain compositions having properties that are compatible with the conditions of use of an aircraft tyre. In addition to these main elements, these compositions comprise the usual additives for compositions of this type, such as a vulcanization system and protective agents. Such aircraft tyre tread compositions have been used for many years and have satisfactory mechanical properties.

Also, WO2017/017123 describes an aircraft tyre whose tread has a composition comprising a blend of specific elastomers, in order to improve the wear generated on landing.

However, it remains advantageous for tyre manufacturers to find solutions for aircraft tyres, making it possible to improve the tear strength (chevron cutting) properties, and to achieve this both at low temperature and at high temperature.

Furthermore, it is always advantageous for manufacturers to find compositions allowing facilitated production of tyres, notably by possible extrusion at higher temperature without initiation of vulcanization. To do this, the compositions must display an increase in the scorch time.

It is within this context that the Applicant has found that particular aircraft tyre tread compositions can improve the properties of aircraft tyres, in particular their resistance to chevron cutting, while at the same time increasing the scorch time of these compositions.

SUMMARY

Consequently, the invention relates to an aircraft tyre whose tread comprises a composition based on at least one elastomeric matrix comprising from 20 to 100 phr of isoprene elastomer and from 0 to 80 phr of a copolymer of butadiene and styrene; a reinforcing filler predominantly comprising carbon black; from 1 to 30 phr of at least one hydrocarbon resin predominantly composed of units derived from aromatic and cycloaliphatic monomers; and a cross-linking system.

I. DETAILED DESCRIPTION OF THE INVENTION

The expression "composition based on" should be understood as meaning a composition including the mixture and/or the product of the in situ reaction of the various base constituents used, some of these constituents being able to react and/or being intended to react with each other, at least partially, during the various phases of manufacture of the composition or during the subsequent curing, modifying the composition as it is prepared at the start. Thus, the compositions as used for the invention may be different in the non-crosslinked state and in the crosslinked state.

Moreover, within the meaning of the present patent application, the term "phr" means parts by weight per hundred parts of elastomers, in a manner well known to a person skilled in the art.

In the present document, unless expressly indicated otherwise, all the percentages (%) shown are mass percentages (%). Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b). In the present document, when an interval of values is denoted by the expression "from a to b", the interval represented by the expression "between a and b" is also and preferentially denoted.

When reference is made to a "predominant" compound, this is understood to mean, within the meaning of the present invention, that this compound is predominant among the compounds of the same type in the composition, that is to say that it is the one which represents the greatest amount by mass among the compounds of the same type. Thus, for example, a predominant polymer is the polymer representing the greatest mass, relative to the total mass of the polymers in the composition. In the same manner, a "predominant" filler is the one representing the greatest mass among the fillers of the composition. By way of example, in a system comprising just one polymer, said polymer is predominant within the meaning of the present invention and, in a system comprising two polymers, the predominant polymer represents more than half of the mass of the polymers. On the contrary, a "minor" compound is a compound which does not represent the greatest mass fraction among the compounds of the same type. Preferably, the term "predominant" means present to more than 50%, preferably more than 60%, 70%, 80%, 90%, and more preferentially the "predominant" compound represents 100%.

Similarly, for the purposes of the present invention, when reference is made to a "predominant" unit (or monomer) within one and the same compound (or polymer), this means that this unit (or monomer) is predominant among the units (or monomers) forming the compound (or polymer), that is to say that it is the one which represents the greatest mass fraction among the units (or monomers) forming the compound (or polymer). Thus, for example, a resin predominantly composed of units resulting from dicyclopentadiene and aromatic monomers is a resin in which the dicyclopentadiene units added to the aromatic units represent the largest mass amount among all the units making up said resin. In other words, a "predominant" monomer or an assembly of "predominant" monomers is a monomer (or an assembly of monomers) which represents the largest mass fraction in the polymer. On the contrary, a "minor" monomer is a monomer which does not represent the largest molar fraction in the polymer.

The compounds mentioned in the description may be of fossil or biobased origin. In the latter case, they may be partially or completely derived from biomass or be obtained from renewable starting materials derived from biomass. Polymers, plasticizers, fillers and the like are notably concerned.

Unless otherwise indicated, the components described in the present document form part of the composition of the tread of the aircraft tyre according to the present invention. Their respective incorporation contents correspond to their contents in the aircraft tyre tread composition according to the present invention.

The aircraft tyre of the invention has a tread comprising a composition based on at least one elastomeric matrix comprising from 20 to 100 phr of isoprene elastomer and from 0 to 80 phr of a copolymer of butadiene and styrene; a reinforcing filler predominantly comprising carbon black; from 1 to 30 phr of at least one hydrocarbon resin predominantly composed of units derived from aromatic and cycloaliphatic monomers; and a crosslinking system.

Elastomeric matrix

According to the invention, the elastomeric matrix comprises from 20 to 100 phr of isoprene elastomer and from 0 to 80 phr of a copolymer of butadiene and styrene.

The isoprene elastomers and copolymers of butadiene and styrene are diene elastomers that are well known to those skilled in the art.

The term "isoprene elastomer" means, in a known manner, an isoprene homopolymer or copolymer, in other words a diene elastomer chosen from the group consisting of natural rubber (NR), synthetic polyisoprenes (IRs), the various isoprene copolymers, and mixtures of these elastomers. Among isoprene copolymers, mention will be made in particular of isobutene/isoprene (butyl rubber—IIR), isoprene/styrene (SIR), isoprene/butadiene (BIR) or isoprene/butadiene/styrene (SBIR) copolymers. This isoprene elastomer is preferably natural rubber or a synthetic cis-1,4-polyisoprene, preferably natural rubber. For example, the synthetic polyisoprene may be a polyisoprene having a content (mol%) of cis-1,4-bonds of greater than 90%, even more preferentially of greater than 98%.

The elastomers used in the context of the present invention may be, for example, block, random, sequential or microsequential elastomers and may be prepared in dispersion or in solution; they may be coupled and/or star-branched and/or functionalized with a coupling and/or star-branching and/or functionalization agent.

The isoprene elastomer may be selected from the group comprising natural rubber, synthetic polyisoprene and a mixture thereof. Preferably, the isoprene elastomer is natural rubber.

For the purposes of the present invention, a "copolymer of butadiene and styrene" refers to any copolymer obtained by copolymerization of one or more butadiene(s) with one or more styrenes. These elastomers may have any microstructure, which depends on the polymerization conditions used, notably on the presence or absence of a modifying and/or randomizing agent and on the amounts of modifying and/or randomizing agent employed.

The elastomers may be, for example, block, random, sequential or microsequential elastomers and may be prepared in dispersion or in solution.

Preferably, the copolymer of butadiene and styrene is functionalized with tin (Sn), i.e. it includes C-Sn bonds (also referred to as Sn functionalization). It may be functionalized simply (C—Sn bonds at the chain end) and/or coupled (Sn atom between two chains) and/or star-branched (Sn atom between three or more chains) with a functionalization and/or coupling and/or star-branching agent. Generically, in order to group together all these elastomers bonded to tin, the term "tin-functionalized elastomers" is used. These elastomers are known to those skilled in the art, for example the ones described in WO 2011/042507.

A person skilled in the art well knows the functionalization and/or coupling and/or star-branching agents that may be used in the context of the present invention. As examples of functionalization agent, mention may be made of the tin-derived functionalization agents which may correspond to the general formula $(X^1{}_1R^1{}_2Sn)$—O—$(SnR^1{}_{3-y}X^1{}_y)$ or $(X^1{}_1R^1{}_2Sn)$—O—$(CH_2)_n$—O—$(SnR^1{}_{3-y}X^1{}_y)$, where y represents an integer having the value 0 or 1, $R^1$ represents an alkyl, cycloalkyl, aryl, alkaryl or vinyl radical containing from 1 to 12 carbon atoms, preferably a butyl, $X^1$ is a halogen atom, preferably chlorine, and n represents an integer from 1 to 20, preferably 4. Furthermore, as tin-comprising coupling or star-branching agents, mention may be made of the tin derivatives of formula $SnR_xX_{4-x}$, x representing an integer having a value from 0 to 2, R representing an alkyl, cycloalkyl, aryl, alkaryl, aralkyl or vinyl radical containing from 1 to 10 carbon atoms, preferably an alkyl radical having from 1 to 4 carbon atoms, and X is a halogen atom, preferably chlorine. Preferential tin derivatives that may be mentioned include dibutyltin dichloride and tin tetrachloride, the latter being most particularly preferred.

The tin-functionalized butadiene and styrene copolymer may be obtained in a manner known per se by reaction of a tin derivative with the butadiene and styrene copolymer. The preparation of a star-branched diene elastomer is described, for example, in patent U.S. Pat. No. 3,393,182.

Other types of functionalization exist for styrene and butadiene copolymers, such as silanol or polysiloxane functional groups bearing a silanol end, or else epoxidized styrene and butadiene copolymers. Such functionalizations are also possible within the context of the present invention.

The copolymer of butadiene and styrene is preferentially a statistical butadiene-styrene (SBR) copolymer. It may be, for example, an SBR prepared in emulsion ("ESBR") or an SBR prepared in solution ("SSBR"). The levels of vinyl (-1.2), trans-1,4 and cis-1,4 bonds of the butadiene part of the SBR can be variable. For example, the vinyl content may be between 15% and 80% (mol %) and the content of trans-1,4-bonds between 15% and 80% (mol %).

Preferably, the copolymer of butadiene and styrene is a copolymer of butadiene and styrene with a low styrene content. The styrene content may preferentially be within a range extending from 5% to 25%, preferably from 5% to 20%, more preferably from 10% to 19%.

Preferably, according to the invention, the content of isoprene elastomer may be within a range extending from 30 to 100 phr, for example from 30 to 70 or from 70 to 100 phr; whereas the content of copolymer of butadiene and styrene is within a range extending from 0 to 70 phr, for example from 0 to 30 phr or from 30 to 70 phr.

In a preferred embodiment of the present invention, the total content of isoprene elastomer and of copolymer of butadiene and styrene is within a range extending from 50 to 100 phr, preferably from 75 to 100 phr.

More preferentially, the total content of isoprene elastomer and of copolymer of butadiene and styrene is 100 phr. In other words, according to this embodiment, the elastomeric matrix of the composition of the tread of the aircraft tyre according to the invention comprises exclusively isoprene elastomer and copolymer of butadiene and styrene.

In the cases where the total content of isoprene elastomer and of copolymer of butadiene and styrene is other than 100 phr, the invention comprises another elastomer in addition to the isoprene elastomer and the copolymer of butadiene and styrene. In this respect, any type of elastomer known to those skilled in the art may be used.

Reinforcing Filler

According to the invention, the aircraft tyre tread composition comprises a reinforcing filler predominantly comprising carbon black.

Use may be made of any type of carbon black known for its abilities to reinforce a rubber composition that may be used in the manufacture of aircraft tyres.

Any carbon black conventionally used in tyres ("tyre-grade" blacks) are suitable for use as carbon blacks. Mention will be made more particularly, for example, of the reinforcing carbon blacks of ASTM grade N326, N330, N339, N347 or N375, or else, depending on the applications targeted, the blacks of higher series (for example N550, N660, N683 or N772), indeed even N990.

The carbon blacks may, for example, be already incorporated in the isoprene elastomer in the form of a masterbatch (see, for example, patent application WO 97/36724 or WO 99/16600).

Preferably, for the invention, use may be made of a carbon black having a high specific surface area. The term "specific surface area" means herein the BET specific surface area measured according to the standard ASTM D6556-09 [multipoint (5 point) method—gas: nitrogen—relative pressure P/PO range: 0.05 to 0.30].

Thus, for the requirements of the invention, the composition predominantly comprises carbon black with a specific surface area of greater than 80 $m^2/g$, preferably greater than 100 $m^2/g$. These carbon blacks are, notably and preferentially, the ones of the 100 and 200 series in the ASTM grades.

Preferably, in the aircraft tyre tread composition of the invention, the amount of carbon black is within a range extending from 20 to 100 phr, preferably from 30 to 70 phr, more preferentially from 40 to 60 phr.

According to one embodiment of the invention, the reinforcing filler is constituted of carbon black, i.e. carbon black is the only reinforcing filler in the aircraft tyre tread composition.

Alternatively and also, preferably, complementarily, the composition of the external sidewall of the tyre of the invention may comprise another reinforcing filler, preferably in a total content of less than 20 phr, more preferentially less than 15 phr.

In this respect, organic fillers other than carbon black and reinforcing mineral fillers are notably suitable for use. As examples of organic fillers other than carbon blacks, mention may be made of functionalized polyvinylaromatic organic fillers, as described in patent applications WO-A-2006/069792 and WO-A-2006/069793. Mineral fillers of the siliceous type, in particular silica ($SiO_2$), or of the aluminous type, in particular alumina ($Al_2O_3$), are notably suitable for use as reinforcing mineral fillers.

The silica that may be used may be any reinforcing silica known to a person skilled in the art, notably any precipitated or fumed silica with a BET surface area and a CTAB specific surface area both of less than 450 $m^2/g$, preferably from 30 to 400 $m^2/g$. As highly dispersible precipitated silicas ("HDSs"), mention will be made, for example, of the Ultrasil 7000 and Ultrasil 7005 silicas from the company Degussa, the Zeosil 1165MP, 1135MP and 1115MP silicas from the company Rhodia, the Hi-Sil EZ150G silica from the company PPG, the Zeopol 8715, 8745 and 8755 silicas from the company Huber or the silicas with a high specific surface area as described in patent application WO 03/16837.

In order to couple the reinforcing mineral filler to the diene elastomer, use is made, in a known manner, of an at least difunctional coupling agent (or bonding agent) intended to provide a satisfactory connection, of chemical and/or physical nature, between the mineral filler (surface of its particles) and the diene elastomer, in particular difunctional organosilanes or polyorganosiloxanes.

According to a preferential embodiment of the invention, the composition comprises, in addition to carbon black, from 1 to 10 phr of silica, preferentially from 2 to 8 phr. Also in this preferred embodiment, the composition preferably comprises 0.1 to 2 phr of a coupling agent, preferably from 0.2 to 1.6 phr.

Plasticizing Resin

According to the invention, the aircraft tyre tread composition comprises from 1 to 30 phr of a plasticizing resin predominantly composed of units derived from aromatic and cycloaliphatic monomers. This resin is also referred to hereinbelow as an aromatic/cycloaliphatic resin.

Plasticizing resins are generally well known to those skilled in the art. They are also occasionally referred to as hydrocarbon resins or high-glass-transition-temperature resins.

As is known to those skilled in the art, the designation "plasticizing resin" is reserved in the present patent application, by definition, for a compound which is, on the one hand, solid at room temperature (23° C.) (as opposed to a liquid plasticizing compound, such as an oil).

Hydrocarbon resins are polymers that are well known to those skilled in the art, which are miscible by nature in diene elastomer compositions when they are additionally described as "plasticizing". They have been described, for example, in the book entitled "*Hydrocarbon Resins*" by R. Mildenberg, M. Zander and G. Collin (New York, VCH, 1997, ISBN 3-527-28617-9), Chapter 5 of which is devoted to their applications, notably in the tyre rubber field (5.5. "*Rubber Tires and Mechanical Goods*"). They may be aliphatic, aromatic or of the aliphatic/aromatic type, i.e. based on aliphatic and/or aromatic monomers. They may be natural or synthetic, based or not based on petroleum (if such is the case, they are also known as petroleum resins). They are preferentially exclusively hydrocarbon-based, i.e. they include only carbon and hydrogen atoms.

The specific resin for the invention is predominantly composed of units derived from aromatic and cycloaliphatic monomers.

As cycloaliphatic monomers, the ones that are intended according to the present invention, and in a conventional manner for a person skilled in the art, are saturated cyclic monomers, and the monomers in the group constituted by cyclopentadiene (abbreviated as CPD), dicyclopentadiene (abbreviated as DCPD), and mixtures thereof, will preferably be chosen.

As aromatic monomers, the monomers in the group constituted by styrene, α-methylstyrene, vinyltoluene, indene and mixtures thereof will preferentially be chosen.

Thus, preferably, the hydrocarbon resin predominantly composed of units derived from aromatic and cycloaliphatic monomers is such that the cycloaliphatic monomers are chosen from the group constituted by cyclopentadiene, dicyclopentadiene and mixtures thereof, and the aromatic monomers are chosen from the group constituted by styrene, α-methylstyrene, vinyltoluene, indene and mixtures thereof. More preferentially, the aromatic monomer is styrene.

The resin that is useful for the purposes of the invention, predominantly composed of units derived from aromatic and cycloaliphatic monomers, may comprise, in addition to these units and in a minor amount, aliphatic units, i.e. units based on aliphatic monomers, other than cycloaliphatic monomers. In this respect, the resin may comprise, in a minor amount, units derived from olefinic monomers.

The aromatic/cycloaliphatic resin preferably has a content of aromatic protons within a range extending from 3% to 40%, preferably from 5% to 30%.

Also preferably, the aromatic/cycloaliphatic resin has a content of ethylenic protons within a range extending from 2% to 15%, preferably from 3% to 10%.

According to a preferential embodiment, the hydrocarbon resin that is useful for the purposes of the invention has a glass transition temperature (Tg) within a range extending from 30° C. to 150° C., preferably from 30° C. to 120° C.

The hydrocarbon resin that is useful for the purposes of the invention has an average molecular mass Mn within a range extending from 300 g/mol to 3000 g/mol and preferably from 400 to 1500 g/mol.

Preferably, the hydrocarbon resin that is useful for the purposes of the invention has a polydispersity index (PI) within a range extending from 1 to 4 and preferentially from 1.5 to 3.5.

Numerous hydrocarbon resins are available commercially. These resins may have characteristics, notably in terms of chemical composition, of Tg, of Mn, of aromatic or ethylenic proton content or of PI, which differ depending on the suppliers. As examples of aromatic/cycloaliphatic plasticizing resins, mention may be made notably of the commercial resins Novares TC160 (Mn=710 g/mol; Mw=2000 g/mol; PI=2.8, Tg=106° C.), Novares TC100 (Mn=460 g/mol; Mw=840 g/mol; PI=1.8, Tg=42° C.) sold by the company Rutgers, the resins Quintone 2940 (Mn=560 g/mol, Mw=1400 g/mol, PI=2.5, Tg=77° C.), sold by the company Nippon Zeon, and the resin LX1200-130 sold by the company Neville (Mn=660 g/mol, Mw=1900 g/mol, PI=2.8, Tg=60° C.).

The glass transition temperature Tg is measured in a known manner by DSC (Differential Scanning calorimetry) according to the standard ASTM D3418 (1999).

The macrostructure (Mw, Mn, PI and Mz) of the hydrocarbon resin is determined by size exclusion chromatography (SEC) on the basis of the standards ISO 16014 (Determination of average molecular mass and molecular mass distribution of polymers using size exclusion chromatography), ASTM D5296 (Molecular weight averages and molecular weight distribution of polystyrene by high performance size exclusion chromatography) and DIN 55672 (size exclusion chromatography).

For these measurements, the resin sample is dissolved in antioxidant-free tetrahydrofuran up to a concentration of 1.5 el. The solution is filtered with a Teflon filter with a porosity of 0.45 μm, using, for example, a single-use syringe fitted with a filter. A volume of 100 μl is injected through a set of size exclusion chromatography columns. The mobile phase is eluted with a flow rate of 1 ml/min. The columns are thermostatically maintained at 35° C. in an oven. Detection is performed by a refractometer thermostatically maintained at 35° C. The stationary phase of the columns is based on a polystyrene/divinylbenzene gel having a controlled porosity. The polymer chains are separated according to the size which they occupy when they are dissolved in the solvent: the larger the volume they occupy, the less the pores of the columns are accessible to them and the shorter their elution time.

A Moore calibration curve connecting the logarithm of the molar mass (logM) to the elution time (et) is produced beforehand with polystyrene standards and modelled by a third degree polynomial: log(molar mass of polystyrene) =a+b et +c et2+d et3.

For the calibration curve, polystyrene standards with narrow molecular distributions are used (polydispersity index, PDI, of less than or equal to 1.1). The range of molar masses of these standards extends from 160 to approximately 70 000 g/mol. These standards may be grouped together in "families" of 4 or 5 standards having a logM increment of approximately 0.55 between each family.

Use may be made of certified (ISO 13885 and DIN 55672) standard kits, for instance the kits of vials from the company PSS (Polymer Standards Service, reference PSS-pskitr1l-3), and also an additional PS standard with Mp=162 g/mol (Interchim, reference 178952). These kits are provided in the form of three vials each containing a family of polystyrene standards in suitable amounts:

Black vial: Mp=1220, 4850, 15 500 and 67 500 g/mol.

Blue vial: Mp=376, 3470, 10 400, 46 000 g/mol.

Yellow vial: Mp=266, 1920, 7200, 28 000 g/mol.

PS162: Mp=162 g/mol.

The number-average molar mass (Mn), the weight-average molar mass (Mw), the Mz and the polydispersity of the resin analysed are calculated from this calibration curve. This is why they are referred to as molar masses relative to a polystyrene calibration.

For the calculation of the average masses and of the PI, the limits of integration of the elution of the product are defined on the chromatogram corresponding to the injection of the sample. The refractometric signal defined between the two limits of integration is "cut" every second. For each of the "elementary cuts", the elution time ti and the area of the signal from the detector Ai are read off.

It is recalled here that: PI=Mw/Mn with Mw being the weight-average molecular mass and Mn being the number-average molecular mass. It is also recalled that the masses Mw, Mn and Mz are average masses calculated according to the following formulae:

$$MZ = \frac{\Sigma Ai * Mi^2}{\Sigma Ai * Mi}$$

$$Mn = \frac{\Sigma Ai}{\frac{\Sigma Ai}{Mi}}$$

$$Mw = \frac{\Sigma Ai * Mi}{\Sigma Ai}$$

in which Ai is the amplitude of the signal from the refractometric detector corresponding to the mass Mi and to the elution time ti.

The equipment used for the SEC measurement is a liquid chromatography system, for example the Waters Alliance 2690 system comprising a pump, a degasser and an injector; a differential refractometer (for example the Waters 2410 refractometer), software for acquiring and processing the data, for example the Waters Empower software, a column oven, for example the Waters "Column Heater Module", and four columns mounted in series in the following order:

| Number | Brand | Range of molar masses (g/mol) | Length (mm) | Inside diameter (mm) | Particle size (μm) | Trade name | References (for information only) |
|---|---|---|---|---|---|---|---|
| Columns 1 and 2 | Polymer Laboratories | 200-400 000 | 300 | 7.5 | 5 | MIXED-D | PL1110-6504 |
| Columns 3 and 4 | Polymer Laboratories | 200-30 000 | 300 | 7.5 | 3 | MIXED-E | PL1110-6300 |

The aromatic proton content (%AH) and the ethylenic proton content (%EH) are measured by $^1$H NMR. This determination is performed with respect to all of the signals detected. Thus, the results obtained are expressed as percentage of the peak area.

The samples are dissolved in deuterated chloroform (CDCl$_3$) in a proportion of approximately 10 mg of resin in approximately 1 ml of solvent. The spectra are acquired on a Brüker Avance 500 MHz spectrometer equipped with a Brüker "broad band" BBO z-grad 5 mm probe. The $^1$H NMR experiment uses a 30° single pulse sequence and a repetition delay of 5 seconds between each acquisition. 64 accumulations are performed at room temperature. The chemical shifts are calibrated with respect to the protonated impurity of the deuterated chloroform; δ ppm $^1$H at 7.20 ppm. The $^1$H NMR signals of the aromatic protons are located between 8.5 ppm and 6.2 ppm. The ethylenic protons for their part give rise to signals between 6.2 ppm and 4.5 ppm. Finally, the signals corresponding to the aliphatic protons are located between 4.5 ppm and 0 ppm. The areas of each category of protons are taken relative to the sum of these areas to thus give a distribution in terms of an area percentage for each category of protons.

The content of aromatic/cycloaliphatic resin is preferentially within a range extending from 2 to 30 phr, more preferentially from 2 to 15 phr.

Below the indicated minimum, the targeted technical effect may prove insufficient, whereas above the upper limit the compromise of properties targeted for the rubber composition under consideration is no longer achieved.

Preferably, for the invention, the composition of the aircraft tyre tread of the invention does not comprise any resin other than the C5 resin described above.

Alternatively, the composition may additionally comprise another plasticizer, such as another plasticizing resin and/or a plasticizing oil in a content of less than or equal to 15 phr, preferably less than or equal to 10 phr.

Crosslinking System

According to the invention, the aircraft tyre tread composition comprises a crosslinking system.

The crosslinking system may be based either on sulfur or on sulfur donors and/or on peroxide and/or on bismaleimides. The crosslinking system is preferentially a vulcanization system, i.e. a system based on sulfur (or on a sulfur-donating agent) and on a primary vulcanization accelerator. Additional to this base vulcanization system are various known secondary vulcanization accelerators or vulcanization activators, such as zinc oxide, stearic acid or equivalent compounds, or guanidine derivatives (in particular diphenylguanidine), or else known vulcanization retarders, which are incorporated during the first non-productive phase and/or during the productive phase, such as are described subsequently.

Sulfur may be used in a preferential content of between 0.5 and 12 phr, in particular between 1 and 10 phr. The primary vulcanization accelerator is used in a preferential content of between 0.5 and 10 phr, more preferentially of between 0.5 and 5.0 phr.

Various Additives

The rubber composition may also include all or some of the usual additives customarily used in elastomer compositions intended to constitute treads, for instance reinforcing resins, pigments, protective agents such as antiozone waxes, chemical antiozonants or antioxidants, or antifatigue agents.

Aircraft Tyres

The present invention relates to tyres intended to equip aircraft. Aircraft tyres are subjected to highly specific stresses related to their use and display certain distinctive features with respect to other types of tyres, such as tyres of passenger, heavy-duty, civil engineering or offroad vehicles.

Generally, a tyre comprises a tread intended to come into contact with the ground via a tread surface and connected via two sidewalls to two beads, the two beads being intended to provide a mechanical connection between the tyre and the rim on which the tyre is fitted.

A radial tyre more particularly comprises a reinforcement comprising a crown reinforcement radially internal to the tread and a carcass reinforcement radially internal to the crown reinforcement.

The carcass reinforcement of an aircraft tyre generally comprises a plurality of carcass plies (or carcass layers) extending between the two beads and divided between a first and a second family.

The first family is constituted by carcass plies which are wound, in each bead, from the inside towards the outside of the tyre, around a circumferential reinforcing element, known as a bead wire, in order to form a turn-up, the end of which is generally radially external to the radially outermost point of the bead wire. The turn-up is the carcass ply portion between the radially innermost point of the carcass ply and its end. The carcass plies of the first family are the closest carcass plies to the internal cavity of the tyre and thus the axially innermost, in the sidewalls.

The second family is constituted by carcass plies which extend, in each bead, from the outside towards the inside of the tyre, as far as an end which is generally radially internal to the radially outermost point of the bead wire. The carcass plies of the second family are the closest carcass plies to the external surface of the tyre and thus the axially outermost, in the sidewalls.

Usually, the carcass plies of the second family are positioned, over their entire length, outside the carcass plies of the first family, that is to say that they cover, in particular, the turn-ups of the carcass plies of the first family. Each carcass ply of the first and of the second family is constituted of reinforcing elements which are parallel to each other, forming, with the circumferential direction, an angle of between 80° and 100°.

According to the invention, the tyre may comprise a number of carcass plies ranging from 2 to 12, preferably from 5 to 10.

The reinforcing elements of the carcass plies are generally cords constituted of spun textile filaments, preferably made of aliphatic polyamide or of aromatic polyamide, and characterized by their mechanical properties in extension. The textile reinforcing elements are subjected to tension over an initial length of 400 mm at a nominal rate of 200 mm/min. All the results are a mean of 10 measurements.

In use, an aircraft tyre is subjected to a combination of load and of pressure inducing a high degree of bending, typically of greater than 30% (for example greater than 32% or 35%). The degree of bending of a tyre is, by definition, its radial deformation, or its variation in radial height, when the tyre changes from an unladen inflated state to an inflated state laden statically, under pressure and load conditions as defined, for example, by the standard of the Tyre and Rim Association or TRA. It is defined by the ratio of the variation in the radial height of the tyre to half the difference between the external diameter of the tyre, measured under static conditions in an unladen state inflated to the reference pressure, and the maximum diameter of the rim, measured on the rim flange. The TRA standard defines in particular the squashing of an aircraft tyre by its squashed radius, that is to say by the distance between the axis of the wheel of the tyre and the plane of the ground with which the tyre is in contact under the reference pressure and load conditions.

An aircraft tyre is furthermore subjected to a high inflation pressure, typically of greater than 9 bar. This high pressure level implies a large number of carcass plies, as the carcass reinforcement is proportioned in order to ensure the resistance of the tyre to this pressure level with a high safety factor. By way of example, the carcass reinforcement of a tyre whose operating pressure, as recommended by the TRA standard, is equal to 15 bar, has to be proportioned to resist a pressure equal to 60 bar, assuming a safety factor equal to 4. Thus, according to the invention, the tyre can have an inflation pressure of greater than 9 bar, preferably of 9 to 20 bar.

The aircraft tyres according to the present invention may be used on any type of aircraft. They are particularly advantageous for aircraft using large-sized tyres. This is because the greater the size of an aircraft tyre, the greater will be the impact of the wear on landing on the overall wear of the tyre. Thus, according to the invention, the tyre may have a size of greater than 18 inches, preferably of 20 to 23 inches.

In use, the rolling mechanical stresses induce bending cycles in the beads of the tyre, which are wound around the rim flanges. These bending cycles generate in particular, in the portions of the carcass plies located in the region of bending on the rim, variations in curvature combined with variations in elongation of the reinforcing elements of the carcass plies. These variations in elongation or deformations, in particular in the axially outermost carcass plies, can have negative minimum values, corresponding to being placed in compression. This placing in compression is capable of inducing fatigue failure of the reinforcing elements and thus premature degradation of the tyre.

Thus, the aircraft tyre according to the invention is preferably an aircraft tyre which is subjected, during its use, to a combination of load and of pressure inducing a degree of bending of greater than 30.

Likewise, the aircraft tyre according to the invention is preferably an aircraft tyre comprising, in addition to the tread, an internal structure comprising a plurality of carcass plies extending between the two beads and divided between a first and a second family, the first family being constituted of carcass plies which are wound, in each bead, from the inside towards the outside of the tyre and the second family being constituted of carcass plies extending, in each bead, from the outside towards the inside of the tyre.

Preparation of the Rubber Compositions

The compositions used in the aircraft tyre treads of the invention may be manufactured in appropriate mixers, using two successive preparation phases according to a general procedure well known to those skilled in the art: a first phase of thermomechanical working or kneading (sometimes referred to as the "non-productive" phase) at high temperature, up to a maximum temperature of between 130° C. and 200° C., preferably between 145° C. and 185° C., followed by a second phase of mechanical working (sometimes referred to as the "productive" phase) at a lower temperature, typically below 120° C., for example between 60° C. and 100° C., during which finishing phase the chemical crosslinking agent, in particular the vulcanization system, is incorporated.

The composition of the tread of the tyre in accordance with the invention may be either in the raw state (before crosslinking or vulcanization) or in the cured state (after crosslinking or vulcanization) and may be a semi-finished product which can be used in a tyre, notably in a tyre tread.

The abovementioned characteristics of the present invention, and also others, will be understood more clearly on reading the following description of several implementation examples of the invention, given as non-limiting illustrations.

II. IMPLEMENTATION EXAMPLES OF THE INVENTION

Measurements and Tests Used

Tensile Tests

These tests make it possible to determine the elasticity stresses and the properties at break; those performed on cured mixtures are performed in accordance with the standard AFNOR-NF-T46-002 of September 1988.

The elongations at break (in %) are measured at two temperatures: at 23° C. and at 100° C., under standard hygrometry conditions (50% relative humidity), according to French standard NF T 40-101 (December 1979), the breaking stresses (in MPa) and the impact energy may also be measured, the impact energy (breaking energy) being the product of the breaking stress and the elongation at break. The results are given in base 100, i.e. the values are expressed relative to a control, the elongation at break of which is considered as the reference at 100.

Tearability

The tearability indices are measured at two temperatures: at 23° C. and at 100° C. The force to be exerted in order to obtain breaking (FRD, in N/mm) is notably determined and the breaking strain (DRD, in %) is measured on a test specimen with dimensions of 10×85×2.5 mm notched at the centre of its length with three notches to a depth of 5 mm, in order to bring about breaking of the test specimen. Thus, the energy for bringing about breaking (energy) of the test specimen, which is the product of the FRD and DRD, can be determined. The results are given in base 100, i.e. the values are expressed relative to a control, the breaking strain (DRD) of which is considered as the reference at 100.

Scorch Time (or Fixing Time)

The measurements are taken at 130° C., in accordance with French standard NF T 43-005. The change in the consistometric index as a function of time makes it possible to determine the scorch time of the rubber compositions, which is assessed in accordance with the abovementioned standard by the parameter T5 (case of a large rotor), expressed in minutes, and defined as being the time necessary to obtain an increase in the consistometric index (expressed in MU) of 5 units above the minimum value measured for this index.

Preparation of the Compositions and Their Properties in the Cured State

Compositions C1 to C10, and the control compositions T1, T2 and T3, the formulations of which in phr are given in Tables 1, 3 and 5, were prepared in the following manner.

The elastomers, the reinforcing filler, the hydrocarbon resin and also the various other ingredients, with the exception of the vulcanization system, are successively introduced into an internal mixer (final degree of filling: approximately 70% by volume), the initial vessel temperature of which is approximately 80° C. Thermomechanical working (non-productive phase) is then performed in one step, which lasts in total approximately 3 to 4 min, until a maximum "dropping" temperature of 165° C. is reached. The mixture thus obtained is recovered and cooled, and sulfur and a sulfamide-type accelerator are then incorporated on a mixer (homofinisher) at 70° C., everything being mixed (productive phase) for an appropriate time (for example approximately ten minutes).

The compositions thus obtained are subsequently calendered, either in the form of slabs (thickness of 2 to 3 mm) or of thin sheets of rubber, for the measurement of their physical or mechanical properties, or extruded in the form of an aircraft tyre tread.

EXAMPLES

The aim of these examples is to show the influence of the incorporation of the hydrocarbon resin predominantly composed of dicyclopentadiene and aromatic units into aircraft tyre tread compositions on the performance compromise between the resistance to cutting and the scorch time. Three types of elastomer matrices were tested.

Tables 1, 3 and 5 present all of the compositions tested, whereas Tables 2, 4 and 6 show the results obtained.

T1, T2 and T3 are control compositions. Compositions C1 to C10 are in accordance with the invention.

The performance results in terms of elongation at break at 23° C. and at 100° C. are expressed as base 100 percentages relative to the control composition, and similarly for the performance results in terms of tear strength at 23° C. and at 100° C. The increase in the scorch time is expressed in minutes relative to the control.

TABLE 1

| Composition | T1 | C1 | C2 | C3 |
|---|---|---|---|---|
| NR (1) | 100 | 100 | 100 | 100 |
| Carbon black (2) | 47 | 47 | 47 | 47 |
| Hydrocarbon resin (3) | 0 | 5 | 7.5 | 10 |
| Antioxidant (4) | 1.5 | 1.5 | 1.5 | 1.5 |
| Antiozonant (5) | 1 | 1 | 1 | 1 |
| Reinforcing resin (6) | 1 | 1 | 1 | 1 |
| Hardener (7) | 1 | 1 | 1 | 1 |
| Stearic acid | 2.5 | 2.5 | 2.5 | 2.5 |
| ZnO | 3 | 3 | 3 | 3 |
| Accelerator (8) | 0.8 | 0.8 | 0.8 | 0.8 |
| Sulfur | 1.5 | 1.5 | 1.5 | 1.5 |

(1) Natural rubber
(2) Carbon black of N115 grade according to standard ASTM D-1765
(3) DCPD/Aromatic hydrocarbon resin Novares TC160 from the company Rütgers Mn = 710 g/mol; Mw = 2000 g/mol; PI = 2.8, Tg = 106° C. Aromatic protons: 13%, Ethylenic protons: 5.6%, Aliphatic protons: 81.4%
(4) N-1,3-dimethylbutyl-N-phenylparaphenylenediamine, Santoflex 6-PPD from the company Flexsys-Solutia
(5) Antiozone wax
(6) Resorcinol reinforcing resin from the company Sumitomo
(7) HMT Hexamethylenetetramine from the company Evonik-Degussa
(8) N-Cyclohexyl-2-benzothiazolesulfenamide, Santocure CBS from the company Flexsys-Solutia

TABLE 2

| Composition | T1 | C1 | C2 | C3 |
|---|---|---|---|---|
| Elongation at break at 23° C. (base 100) | 100 | 109 | 113 | 115 |
| Elongation at break at 100° C. (base 100) | 100 | 123 | 125 | 132 |
| DRD at 23° C. (base 100) | 100 | 141 | 147 | 152 |
| DRD at 100° C. (base 100) | 100 | 117 | 173 | 199 |
| Increase in scorch time (minutes) | 0 | 7 | 9 | 9 |

TABLE 3

| Composition | T2 | C4 | C5 | C6 | C7 |
|---|---|---|---|---|---|
| NR (1) | 50 | 50 | 50 | 50 | 50 |
| SBR (9) | 50 | 50 | 50 | 50 | 50 |
| Carbon black (2) | 49 | 49 | 49 | 49 | 49 |
| Silica (10) | 5 | 5 | 5 | 5 | 5 |
| Coupling agent (11) | 1 | 1 | 1 | 1 | 1 |
| Hydrocarbon resin (3) | 0 | 2.5 | 5 | 7.5 | 10 |
| Antioxidant (4) | 1.5 | 1.5 | 1.5 | 1.5 | 1.5 |
| Antiozonant (5) | 1 | 1 | 1 | 1 | 1 |
| Stearic acid | 2.5 | 2.5 | 2.5 | 2.5 | 2.5 |
| ZnO | 3 | 3 | 3 | 3 | 3 |
| Accelerator (8) | 0.8 | 0.8 | 0.8 | 0.8 | 0.8 |
| Sulfur | 1.5 | 1.5 | 1.5 | 1.5 | 1.5 |

(9) Tin-functionalized solution SBR, with 24% of 1,2-polybutadiene units, 15.5% of styrene units − Tg = −65° C.
(10) Silica, Zeosil 1165 MP from the company Solvay-Rhodia, HDS type
(11) Silane

TABLE 4

| Composition | T2 | C4 | C5 | C6 | C7 |
|---|---|---|---|---|---|
| Elongation at break at 23° C. (base 100) | 100 | 104 | 116 | 121 | 123 |
| Elongation at break at 100° C. (base 100) | 100 | 115 | 130 | 142 | 157 |
| DRD at 23° C. (base 100) | 100 | 113 | 143 | 177 | 189 |
| DRD at 100° C. (base 100) | 100 | 113 | 144 | 179 | 108 |
| Increase in scorch time (minutes) | 0 | 15 | 17 | 20 | 22 |

TABLE 5

| Composition | T3 | C8 | C9 | C10 |
|---|---|---|---|---|
| NR (1) | 35 | 35 | 35 | 35 |
| SBR (9) | 65 | 65 | 65 | 65 |
| Carbon black (2) | 49 | 49 | 49 | 49 |
| Silica (10) | 5 | 5 | 5 | 5 |
| Coupling agent (11) | 1 | 1 | 1 | 1 |
| Hydrocarbon resin (3) | 0 | 5 | 7.5 | 10 |
| Antioxidant (4) | 1.5 | 1.5 | 1.5 | 1.5 |
| Antiozonant (5) | 1 | 1 | 1 | 1 |
| Stearic acid | 2.5 | 2.5 | 2.5 | 2.5 |
| ZnO | 3 | 3 | 3 | 3 |
| Accelerator (8) | 0.8 | 0.8 | 0.8 | 0.8 |
| Sulfur | 1.5 | 1.5 | 1.5 | 1.5 |

TABLE 6

| Composition | T3 | C8 | C9 | C10 |
|---|---|---|---|---|
| Elongation at break at 23° C. (base 100) | 100 | 116 | 128 | 132 |
| Elongation at break at 100° C. (base 100) | 100 | 101 | 102 | 99 |
| DRD at 23° C. (base 100) | 100 | 146 | 147 | 216 |
| DRD at 100° C. (base 100) | 100 | 131 | 149 | 162 |
| Increase in scorch time (minutes) | 0 | 18 | 20 | 22 |

The set of results shows that the cutting resistance performance as represented by the elongation at break and tearability measurements, both at 23° C. and 100° C., are very much improved by the invention. Similarly, the scorch time is substantially lengthened, making it possible to increase the industrial productivity during the manufacture of aircraft tyres.

The invention claimed is:

1. An aircraft tire having a tread comprising a composition based on at least:
   an elastomeric matrix comprising 100 phr of isoprene elastomer;
   from 40 to 60 phr of a reinforcing filler, wherein the reinforcing filler is carbon black;
   from 2 to 15 phr of at least one hydrocarbon resin predominantly composed of units derived from aromatic and cycloaliphatic monomers; and
   a crosslinking system,
   wherein a number of carcass plies is within a range extending from 2 to 12.

2. The tire according to claim 1, wherein the isoprene elastomer is selected from the group consisting of natural rubber, synthetic polyisoprene and a mixture thereof.

3. The tire according to claim 1, wherein the isoprene elastomer is natural rubber.

4. The tire according to claim 1, wherein the reinforcing filler has a specific surface area of greater than 80 m$^2$/g.

5. The tire according to claim 1, wherein the at least one hydrocarbon resin is such that the cycloaliphatic monomers are selected from the group consisting of cyclopentadiene, dicyclopentadiene and mixtures thereof, and the aromatic monomers are selected from the group consisting of styrene, a-methylstyrene, vinyltoluene, indene and mixtures thereof.

6. The tire according to claim 1, wherein the at least one hydrocarbon resin has a content of aromatic protons within a range extending from 3% to 40% of a total proton weight in the at least one hydrocarbon resin.

7. The tire according to claim 1, wherein the at least one hydrocarbon resin has a content of ethylenic protons within a range extending from 2% to 15% of a total proton weight in the at least one hydrocarbon resin.

8. The tire according to claim 1, wherein the at least one hydrocarbon resin has a glass transition temperature within a range extending from 30° C. to 150° C.

9. The tire according to claim 1, wherein the at least one hydrocarbon resin has an average molecular mass Mn within a range extending from 300 g/mol to 3000 g/mol.

10. The tire according to claim 1, wherein the at least one hydrocarbon resin has a polydispersity index within a range extending from 1 to 4.

11. The tire according to claim 1, wherein the size of the tire is greater than or equal to 18 inches.

* * * * *